Dec. 20, 1955   R. D. THOMPSON   2,727,278
METHOD OF MAKING MOLDED COMPOSITE ARTICLE
Filed Nov. 21, 1952   2 Sheets-Sheet 1
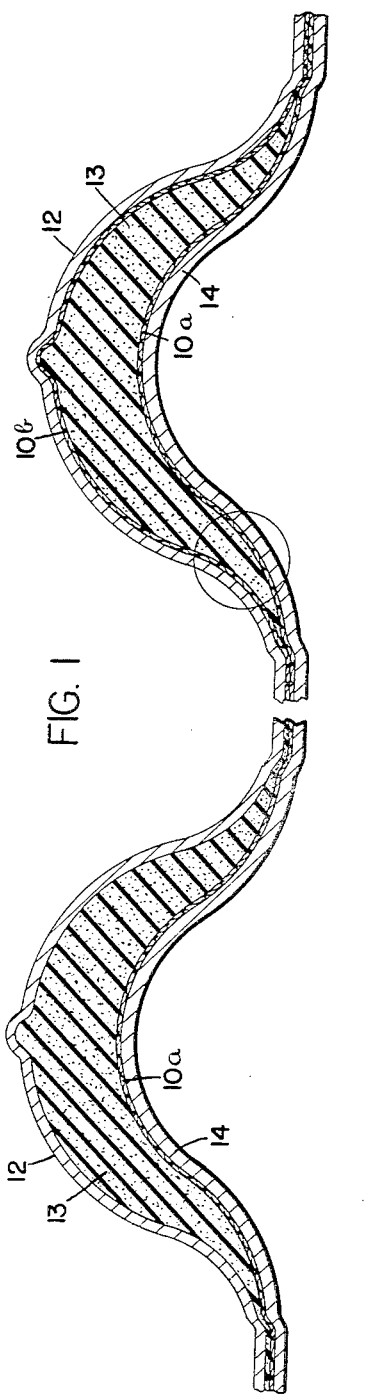
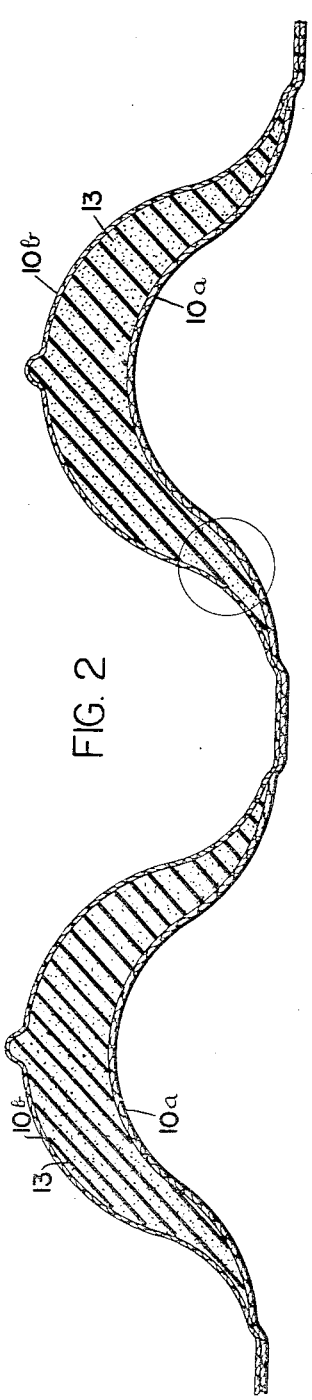
INVENTOR.
ROBERT D. THOMPSON
BY Ely, Frye & Hamilton
ATTORNEYS

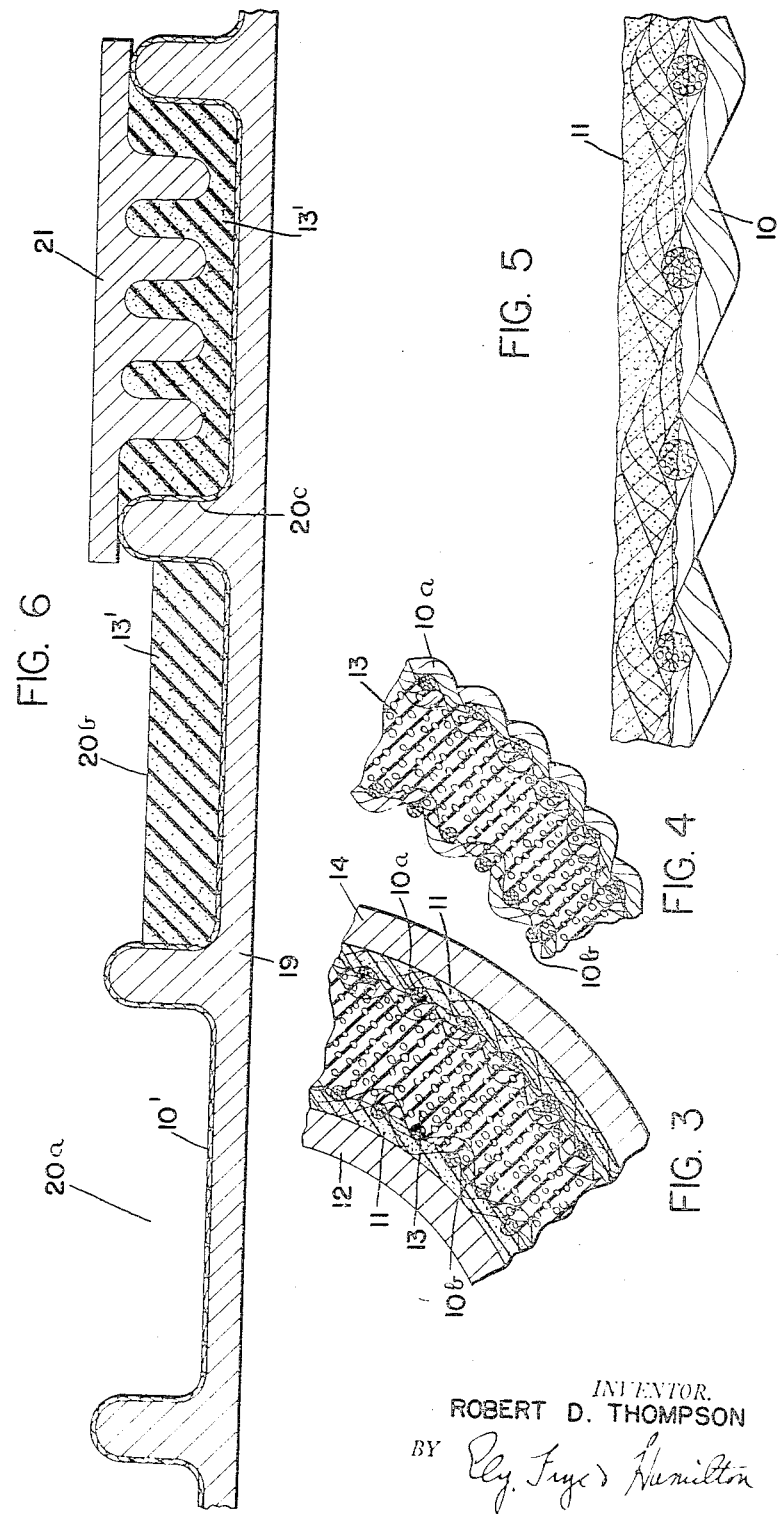

United States Patent Office 2,727,278
Patented Dec. 20, 1955

2,727,278

METHOD OF MAKING MOLDED COMPOSITE ARTICLE

Robert D. Thompson, Akron, Ohio

Application November 21, 1952, Serial No. 321,760

8 Claims. (Cl. 18—59)

The invention relates generally to contoured articles having a foam rubber body with a flexible covering material such as fabric. More particularly, the invention relates to such articles in which the foam rubber body adheres to the covering by penetration, and to a novel method of making such articles.

In the manufacture of numerous articles such as breast pads, chair pads, cushions and mattresses, which are padded or cushioned with foamed rubberlike materials, the foam is first molded into the desired contour and then encased in a flexible covering material such as fabric having the desired hand or exterior surface characteristics. This process is costly, and the product is unsatisfactory for many reasons including the difficulty of making the covering conform smoothly to the foam body. It has been proposed to use an adhesive to cause the covering material to adhere to the foam, but this gives rise to the difficulty of preforming the covering material to the precise contours of the surface desired in the finished article, without impairing the hand or exterior surface characteristics of the fabric covering. In making certain foamed latex articles covered with fabric, the uncured latex is made to adhere to the fabric by penetration, but the latex tends to strike through the fabric and impair the hand of the exterior surface.

It is an object of the present invention to provide a novel contour molded composite article having a foam body united by penetration with a flexible covering having its exterior surface characteristics unimpaired.

Another object is to provide a novel method of molding as a unit a composite article comprising a foamed body united by penetration to a preformed fabric covering having its original outer hand.

These and other objects are accomplished by treating the exterior of the covering material with a filler material which may be adhesive to temporarily unite the covering material to the mold during forming and permit removal therefrom after forming, or may act as a stiffener, which filler in either case will penetrate part way only through fabric covering material, molding the treated covering material to the desired contour, introducing the foam into the molded covering and uniting the foam to the covering by penetration into the fabric, curing the foam, and dissipating the filler during or after curing.

Various changes and modifications in details in the article or the method of making it may be made within the scope of the invention as defined by the appended claims.

Referring to the drawings:

Fig. 1 is a fragmentary sectional view through complementary mold parts during the molding according to the present improved method of a novel foam rubber brassiere having a fabric covering, one half being shown as having both inner and outer fabric coverings conforming to the interior mold surfaces, and the other half as having only an inner fabric covering;

Fig. 2 is a sectional view showing a finished molded brassiere having inner and outer fabric coverings and removed from the mold;

Fig. 3 is an enlarged fragmentary sectional view of the area substantially within the circle in Fig. 1;

Fig. 4 is an enlarged fragmentary sectional view of the area substantially within the circle in Fig. 2.

Fig. 5 is a further enlarged view of a knitted fabric having one surface treated with filler which penetrates substantially half way through the fabric; and Fig. 6 is a schematic sectional view showing how novel foam rubber pads having fabric coverings can be continuously molded according to the invention.

In carrying out the invention a variety of materials may be used to comprise the fabric covering as long as they are capable of permanent yield or stretch in all directions so that they can be drawn or conformed to the contour of the mold which forms the finished article. Knit textiles such as jersey, tricot, milanaise, having all-directional stretch are suitable, and their yield characteristics can be controlled by the degree of stretch and so-called "hold out" used in the finishing operation. Also, certain woven fabrics which are woven from yarns capable of permanent yield are suitable. In general, any fabric can be used if it is capable of permanent yield so as to be conformed to the required contour, and has sufficient porosity to permit partial penetration on one surface of the filler material and partial penetration on the other surface of the foamed material.

The filler material may be a sizing capable of making the fabric stiff at room temperatures and at normal humidity ranges, in which case the fabric may serve as a mold itself with or without partial reinforcement from a conventional mold; or it may be an adhesive which will adhere the fabric to the inner contoured surface of the mold while the foamed body is applied to the inner surface of the fabric, and which will permit removal of the molded article from the mold. In either case the filler material must be such that its penetration into the fabric can be controlled, and one which can be completely dissipated from the fabric during or after the molding operations following introduction of the foamed material, so as to restore the outer surface of the fabric to its original hand or characteristics.

The filler material may be both a stiffener and an adhesive, and a good example of such a material may be a starch which is highly water-soluble at temperatures of 200° F. and over. Such a starch may be removed from the fabric at the proper stage in the process by treatment with hot water or enzymes or chemical conversion, and the outer surface of the finished article will have the desired soft hand or feel of the original fabric.

The first step in the novel molding process is illustrated in Fig. 5 which shows schematically an enlarged section of knitted fabric 10, which may be tricot, one surface of which has been treated with a filler material 11 so that the filler penetrates substantially half way through the thickness of the fabric. This filler material may be applied to the fabric in various ways, as by print coating or roll coating, the pressure, time, temperature and viscosity being controlled to accomplish the desired extent of penetration into the fabric. Alternatively, a coating of liquid or semi-liquid filler of controlled thickness may be applied first to the inner mold surface and the fabric laid thereover in such manner as to accomplish the desired degree of penetration into the outer surface of the fabric.

If the filler is applied to the fabric before insertion into the mold, the fabric is laid into the mold while the filler is still moist, and a heated molding form of complementary contour is pressed down into the fabric to draw or conform it to the contour of the mold surface, and to hold it in this position until the filler is set. If the filler is a stiffener, the filled fabric will be formed into a stiff contoured wall conforming to the mold contour, and can be removed from the forming mold if desired and subsequently used as a mold itself with or without reinforcement, as previously set forth.

If the filler is an adhesive, when it sets it forms a sufficient temporary bond between the fabric and mold to hold the fabric in shape and prevent its distortion while the formed fabric is filled with foamed rubber and until the foam jells or otherwise takes its final form. As shown in Fig. 1 (right half) and Fig. 3, the outer mold part 12 has its inner surface shaped to form the outer contour of a foam rubber breast pad 13 and the inner mold part 14 has its inner surface shaped to form the inner contour of the breast pad 13. A piece of filled fabric 10a, which may be knitted fabric such as shown in Fig. 5 has been applied and conformed to the inner surface of mold part 14, and a piece of similarly treated fabric 10b has been applied and conformed to the inner surface of mold part 12. The fabric 10b may be a yieldable woven fabric as shown, or it may be the same fabric as 10a. Both the fabrics 10a and 10b are applied to the mold parts with their filled surfaces next to the mold surfaces.

In the left half of Fig. 1, the fabric 10b has been omitted, but the construction is otherwise the same as in the right half.

Where the finished article has deep contours requiring the fabric to be drawn beyond its normal yield limitations, as for example a deep seat pad having a relatively sharp changing contour, it may be necessary to partially preform the fabric by cutting and seaming before it is pressed into the contour of the mold.

In carrying out the method of the invention, after the filled fabrics have been separately applied and conformed to the mold parts, the foam is poured or introduced into the mold or expanded between the mold parts which are brought together and held in proper relation until the foam sets or jells. The foam may be rubber latex foam, vinyl foam, or any other foamed rubberlike material having similar characteristics. A latex foam comprising a liquid dispersion of latex, for example, will immediately penetrate into the interstices of the unfilled side of the fabrics 10a and 10b until it reaches the filler 11 which acts as a dam limiting the extent of penetration.

If the filler is an adhesive the bond between the filler and the mold surfaces will maintain the contour of the fabric and prevent its distortion during the filling and jelling of the foam, whereas if the filler is a stiffener the filled contoured wall of the fabric will also hold its shape during the filling and jelling of the foam. In either case the dual function of the filler, to control penetration into and maintain contour of the fabric, will have been performed when the foam has jelled, and the mold parts may be removed if desired.

The foam may now be vulcanized or cured, forms a very secure adhesive bond between the foam and fabric by reason of the penetration of the foam into the fabric, and the manner of accomplishing the curing may vary somewhat depending upon the kind of foam and the type of adhesive used. Where the filler is a starch which is highly water soluble at temperatures above 200° F., the curing may be done by subjecting the molded article to steam or hot water at the proper temperature, and the filler material will be dissolved during the curing process, without affecting the bond between the foam and the fabric. Otherwise, the filler may be dissipated by suitable treatment with enzymes or by chemical conversion, and the curing may in some cases be a separate operation from the dissipation operation. Moreover, certain fillers may be used which are capable of dissipation by the application of dry high temperatures.

Regardless of the manner of removing the filler from the molded finished product, the operation is continued until the filler is substantially completely dissipated, and the outer surface of the fabric has regained its hand or characteristic feel and appearance. The resulting article may be a padded brassiere such as shown in Figs. 2 and 4, in which the cured foam has formed a bond with the inner and outer coverings 10a and 10b of fabric, by penetration substantially halfway through said coverings from the inside outward, and in which the outer filler layer in the fabrics has been dissipated to restore their original characteristics.

If desired the outer fabric covering 10b can be omitted, and the brassiere furnished with the inner covering 10a only, so that the outer covering may be subsequently applied by the manufacturer, merchandizer or the like.

While the invention has been specifically described as applied to the manufacture of a single unit, it is obvious that the same principles can be applied to the making of multiple units in gang molds. Also, as shown in Fig. 6, the invention is easily applicable to continuous molding by means of a moving belt 19 having a series of consecutive mold cavities indicated at 20a, 20b and 20c. As the belt progresses a strip of fabric 10′ having one surface treated with a filler 11 as in Fig. 5 is laid in the mold cavities filled side down, and conformed to the contour of the mold cavities in any suitable manner. As the mold cavities pass a certain station, the uncured rubber foam 13′ is introduced as shown in cavity 20b, and at a subsequent station a heated press form 21 may be applied to a cavity 20c to mold and cure the foam. If the filler is capable of dissipation under dry heat it may be dissipated by the heat of curing or the molded fabric covered pads may be first removed and then treated to dissipate the filler from the fabric covering.

The present invention provides a simple, economical method of producing a novel molded article having a foam body and a fabric covering adhering thereto by penetration of the foam without additional adhesive, and having its original external surface characteristics.

What is claimed is:

1. The method of making molded composite articles having a body of foamed elastomeric material and a covering of fabric material, which includes applying a layer of filler material to the outer surface of said covering material and limiting the penetration of the filler part way through the covering material by control of temperature and viscosity, causing said filled covering material to conform to the interior of a mold having the contour of the finished article, molding uncured foamed elastomeric material onto the formed covering material to cause penetration of the foamed material into the fabric, curing the foamed material and dissipating the filler material.

2. The method of making molded composite articles having a body of foamed elastomeric material and a covering of fabric material, which includes applying a layer of adhesive material to the outer surface of said covering material and penetrating part way only through said material by control of temperature and viscosity, conforming said filled covering material to conform to the interior surface of a mold having the contour of the finished article by adhering its filled surface to the mold surface, applying uncured latex foam to the inner surface of said covering material to cause it to penetrate into the fabric to the filled material, curing the latex foam, and dissipating the filler material.

3. The method of making molded composite articles having a body of foamed elastomeric material and a covering of fabric material, which includes applying a layer of filler material to the outer surface of said covering material and limiting the penetration of the filler part way through the covering material by control of temperature and viscosity, molding said filled covering material to set the filler and conform the filled covering material to the desired finished contour of the article, molding uncured foamed elastomeric material onto said filled covering material to cause penetration of the foamed material into the fabric, curing the foamed material, and dissipating the filler material.

4. The method of making molded composite articles having a body of foamed elastomeric material and a covering of fabric material, which includes applying a layer of adhesive to the outer surface of said covering material and penetrating part way only through said material by control of temperature and viscosity, bonding said adhesively coated surface of said covering to the interior surface of a mold having the contour of the finished article, applying uncured elastomeric foam to the inner surface of said covering material to cause it to penetrate to the adhesive layer, curing the foamed material, and dissipating the adhesive.

5. The method of making molded composite articles having a body of foamed elastomeric material and a covering of fabric material, which includes applying a layer of adhesive to the outer surface of said covering material and penetrating part way only through said material by control of temperature and viscosity, conforming said coated fabric to the inner surface of a contoured mold with the coated side of the fabric in contact with the mold, bonding said coated surface of the fabric to the mold surface, applying uncured elastomeric foam to the other surface of said fabric and causing it to penetrate the interstices thereof to the depth of said adhesive layer, and curing the foam and dissipating the adhesive.

6. The method of making molded composite articles having a body of foamed elastomeric material and a covering of fabric material, which includes applying to the outer surface of the fabric a layer of filler material which is water soluble at temperatures approaching 212° F. and limiting the penetration of the filler part way through the fabric by control of temperature and viscosity, causing said filled fabric to conform to the inner contour of a mold, applying uncured foam to the unfilled side of the fabric and causing it to penetrate thereinto to the depth of said filler material, and curing the foam and dissipating the filler by the application of water at temperatures inducing the solubility of the filler material.

7. The method of making molded composite articles having a body of foamed elastomeric material and a covering of fabric material, which includes applying liquid filler material to the outer surface of said fabric material and controlling the depth of penetration of the filler material into the fabric by regulation of temperature and viscosity, conforming said filled material to a predetermined contour, molding uncured latex foam onto the inner surface of said covering material to cause penetration of said foam into the fabric to the depth of the filler, curing the latex foam, and dissipating the filler material.

8. The method of making molded composite articles having a body of foamed elastomeric material and a covering of fabric material, which includes applying settable liquid filler material to the outer surface of said fabric material and controlling the depth of penetration of the filler material into the fabric by regulation of temperature and viscosity, conforming said filled material to a predetermined contour before setting of the filler material and then allowing it to set, molding uncured latex foam onto the inner surface of said covering material to cause penetration of said foam into the fabric to the depth of the filler, and curing the latex foam and dissipating the filler material.

References Cited in the file of this patent

UNITED STATES PATENTS

| Number | Name | Date |
| --- | --- | --- |
| 959,178 | Streat | May 24, 1910 |
| 2,193,496 | Schwartz et al. | Mar. 12, 1940 |
| 2,271,058 | Binns | Jan. 27, 1942 |
| 2,308,305 | Reynolds | Jan. 12, 1943 |
| 2,434,527 | Untiedt | Jan. 13, 1948 |
| 2,563,478 | Mason et al. | Aug. 7, 1951 |
| 2,625,499 | Nebesar | Jan. 13, 1953 |
| 2,648,619 | Alderfer | Aug. 11, 1953 |
| 2,649,391 | Alderfer | Aug. 18, 1953 |